United States Patent
Machado et al.

(10) Patent No.: US 11,769,013 B2
(45) Date of Patent: Sep. 26, 2023

(54) MACHINE LEARNING BASED TENANT-SPECIFIC CHATBOTS FOR PERFORMING ACTIONS IN A MULTI-TENANT SYSTEM

(71) Applicant: salesforce.com, inc., San Francisco, CA (US)

(72) Inventors: Michael Machado, Burlingame, CA (US); James Douglas Harrison, Mill Valley, CA (US); Caiming Xiong, Menlo Park, CA (US); Xinyi Yang, San Francisco, CA (US); Thomas Archie Cook, Boulder, CO (US); Roojuta Lalani, Fremont, CA (US); Jean-Marc Soumet, San Jose, CA (US); Karl Ryszard Skucha, Los Altos, CA (US); Juan Rodriguez, Mountain View, CA (US); Manju Vijayakumar, Pleasanton, CA (US); Vishal Motwani, Palo Alto, CA (US); Tian Xie, Palo Alto, CA (US); Bryan McCann, Menlo Park, CA (US); Nitish Shirish Keskar, San Francisco, CA (US); Zhihao Zou, Foster City, CA (US); Chitra Gulabrani, Palo Alto, CA (US); Minal Khodani, Foster City, CA (US); Adarsha Badarinath, Fremont, CA (US); Rohiniben Thakar, Newark, CA (US); Srikanth Kollu, Pleasanton, CA (US); Kevin Schoen, Bothell, WA (US); Qiong Liu, Cupertino, CA (US); Amit Hetawal, San Ramon, CA (US); Kevin Zhang, San Francisco, CA (US); Kevin Zhang, Alameda, CA (US); Johnson Liu, Santa Clara, CA (US); Rafael Amsili, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 156 days.

(21) Appl. No.: 16/680,323

(22) Filed: Nov. 11, 2019

(65) Prior Publication Data
US 2021/0141865 A1     May 13, 2021

(51) Int. Cl.
*G10L 15/16*    (2006.01)
*G06F 40/30*    (2020.01)
(Continued)

(52) U.S. Cl.
CPC ............ *G06F 40/30* (2020.01); *G06F 40/295* (2020.01); *G06N 3/04* (2013.01); *G06N 3/08* (2013.01); *H04L 51/02* (2013.01)

(58) Field of Classification Search
CPC ........ G06F 40/30; G06F 40/295; G06F 40/35; G06N 3/04; G06N 3/08; H04L 51/02; G10L 15/22
See application file for complete search history.

(56) References Cited

U.S. PATENT DOCUMENTS 8,346,563 B1 *  1/2013  Hjelm ................. G10L 15/1822
                                                        704/251
9,633,004 B2    4/2017  Giuli et al.
(Continued)

OTHER PUBLICATIONS

Kitaev, N. et al., "Constituency Parsing with a Self-Attentive Encoder," arXiv: 1805.01052, May 2, 2018, pp. 1-12.
(Continued)

*Primary Examiner* — Olujimi A Adesanya
(74) *Attorney, Agent, or Firm* — Fenwick & West LLP (57) ABSTRACT

A multi-tenant system performs custom configuration of a tenant-specific chatbot to process and act upon natural language requests. The multi-tenant system configures the tenant-specific chatbots without requiring tenant-specific
(Continued)

training. The multi-tenant system providing a user interface for configuring a tenant-specific set of permitted actions. The multi-tenant system determines a set of example phrases for each of the selected permitted actions. The multi-tenant system receives a natural language request from a user and identifies the action that the user wants to perform. The multi-tenant system uses a neural network to compare the natural language request with example phrases to identify an example phrase that matches the natural language request. The multi-tenant system performs the action corresponding to the matching example phrase.

20 Claims, 8 Drawing Sheets

(51) Int. Cl.
*G06N 3/08* (2023.01)
*H04L 51/02* (2022.01)
*G06N 3/04* (2023.01)
*G06F 40/295* (2020.01)

(56) References Cited

U.S. PATENT DOCUMENTS

| | | | | |
|---|---|---|---|---|
| 10,600,004 | B1* | 3/2020 | Misko | G06N 3/084 |
| 10,916,241 | B1* | 2/2021 | Edwards | G10L 15/22 |
| 11,410,087 | B2* | 8/2022 | Hatchard | G06Q 50/01 |
| 2013/0103391 | A1* | 4/2013 | Millmore | G06Q 10/06 704/9 |
| 2013/0246050 | A1* | 9/2013 | Yu | G10L 21/00 704/9 |
| 2014/0379615 | A1 | 12/2014 | Brigham et al. | |
| 2014/0380285 | A1 | 12/2014 | Gabel et al. | |
| 2018/0157641 | A1* | 6/2018 | Byron | G06F 16/23 |
| 2018/0239837 | A1 | 8/2018 | Wang | |
| 2018/0285340 | A1* | 10/2018 | Murphy | G06F 40/295 |
| 2018/0336050 | A1* | 11/2018 | Mukherjee | G06F 9/541 |
| 2019/0019509 | A1* | 1/2019 | Lee | G10L 15/22 |
| 2019/0027134 | A1* | 1/2019 | Kakirwar | G10L 15/1822 |
| 2019/0236204 | A1 | 8/2019 | Canim et al. | |
| 2019/0377791 | A1* | 12/2019 | Abou Mahmoud | G06F 40/226 |
| 2020/0234084 | A1* | 7/2020 | Seaton | G06F 40/295 |
| 2020/0302924 | A1* | 9/2020 | Andreica | G10L 15/22 |
| 2020/0394360 | A1* | 12/2020 | Dunn | G06N 3/08 |
| 2021/0027774 | A1* | 1/2021 | Kessler | G06N 3/08 |
| 2021/0142103 | A1* | 5/2021 | Xie | G06N 20/00 |
| 2021/0194971 | A1* | 6/2021 | Thum | H04L 51/02 |
| 2021/0374353 | A1 | 12/2021 | Zhang et al. | |

OTHER PUBLICATIONS

Kitaev, N. et al., "Multilingual Constituency Parsing with Self-Attention and Pre-Training," arXiv: 1812.11760, Jun. 4, 2019, pp. 1-7.

Vaswani, A. et al., "Attention Is All You Need," 31st Conference on Neural Information Processing Systems (NIPS 2017), Dec. 2017, pp. 1-15.

United States Office Action, U.S. Appl. No. 16/718,186, dated Jul. 13, 2022, 28 pages.

United States Office Action, U.S. Appl. No. 16/718,186, dated Feb. 24, 2022, 21 pages.

* cited by examiner

Receive a natural language request to perform an action
410

For each example phrase

Input the natural language request and the example phrase to a neural network
420

Execute the neural network to generate a score
430

Select an example phrase that best matches the natural language request based on the scores
440

Determine an intent of the natural language request based on the selected example phrase
450

Perform an action corresponding to the determined intent
460

MACHINE LEARNING BASED TENANT-SPECIFIC CHATBOTS FOR PERFORMING ACTIONS IN A MULTI-TENANT SYSTEM

BACKGROUND

Field of Art

This disclosure relates in general to machine learning, and in particular to machine learning based tenant-specific chatbots for performing actions in a multi-tenant system.

Description of the Related Art

Multi-tenant systems use chatbots that allow users to interact with the multi-tenant system using natural language. For example, a chatbot allows a user to ask natural language questions to request certain actions. The chatbot may also provide natural language responses to the user. A chatbot may support text, speech, graphics, or other modes of interaction for input or output.

Building a chatbot is a complex effort involving several software developers, data scientists, artificial intelligence experts, and so on. Often the effort involves collecting training data for training machine learning models for performing various actions associated with the chatbot. Conventional chatbots are configured to perform a fixed set of predefined tasks. For example, if the underlying system is extended to perform new functionality, the chatbot is likely to fail in performing conversations involving the new functionality. Furthermore, significant effort is involved in configuring a chatbot for different systems that support different functionality. For example, a multi-tenant system may have several tenants that have different data schemas and support different features. As a result, each tenant has different requirements for a chatbot. Conventional techniques require separate design and development efforts of chatbots for each tenant. For example, machine learning models used by chatbots may require separate training for each tenant.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

A multi-tenant system performs custom configuration of a tenant-specific chatbot. The chatbot processes and acts upon natural language requests to allow users to perform actions of the multi-tenant system. The chatbot uses machine learning based models that do not require requiring tenant-specific training. A chatbot is also referred to as a conversational agent, a dialog system, virtual assistant, or artificial intelligence (AI) assistant. A tenant refers to an entity, for example, an organization enterprise that is a customer of the multi-tenant system. The term tenant as used herein can refer to the set of users of the entire organization that is the customer of the multi-tenant system or to a subset of users of the organization. Accordingly, the tenant-specific chatbot may be customized for a set of users, for example, the entire set of users of the organization, a specific group of users within the organization, or an individual user within the organization.

The multi-tenant system configures a user interface that displays a set of actions and allows the user to configure a tenant-specific set of permitted action. Examples of actions that the user may request include searching for a contact, updating an account with certain information, updating status of a project, and so on. The tenant-specific set of permitted actions may represent the actions that a set of users having a particular role are allowed to perform using the multi-tenant system.

The multi-tenant system determines a set of example phrases for each of the selected permitted actions. Each example phrase represents a natural language request for performing an action using the multi-tenant system. For example, if the action is to search for a contact, the example phrases include "find me," "can you find me," "who is," "please find," and so on. The multi-tenant system uses the example phrases to configure a tenant-specific chatbot.

The tenant-specific chatbot is configured to receive a natural language request from a user and identify the action that the user wants to perform using the multi-tenant system. The multi-tenant system determines the action requested by the user by comparing the natural language request to predefined example phrases. The predefined example phrases are associated with known actions that can be performed using the multi-tenant system.

The multi-tenant system uses a neural network to compare the received natural language request with the stored example phrases. The neural network receives the natural language request as an input and an example phrase as another input and determines whether the example phrase can be inferred from the natural language request. The multi-tenant system repeatedly compares the received natural language request with each example phrase to select the example phrase that best represents the received natural language request. The multi-tenant system determines that the action represented by the selected example phrase represents the action requested by the user.

The disclosed technique of comparing a received natural language request with example phrases allows the multi-tenant system to modify the set of example phrases without requiring retraining of the model. For example, if the tenant-specific set of permitted actions changes over time, the multi-tenant system can update the set of example phrases to account for the changes to the tenant-specific set of permitted actions and continue to reuse the neural network without retraining the neural network.

The disclosed techniques are distinct from techniques that use models that receive a natural language request as input and predict the requested action, for example, by outputting a score indicating a likelihood that the natural language request is for a particular action. Such models need to be retrained if there are changes in the actions performed by the multi-tenant system. For example, if there are changes in the actions since the model was trained, for example, the types of actions change, the parameters associated with an action change, or the behavior of an action changes, the results predicted by the model may not be valid any more. The model may have to be reconfigured or retrained.

The disclosed embodiments overcome these shortcomings since the neural network as disclosed predicts whether the natural language request corresponds to a predefined example phrase which in turn maps to an action. Such neural network can be trained once and used with tenant-specific sets of example phrases that correspond to different sets of actions. Accordingly, the trained neural network can be reused across different tenants or for system with evolving set of permitted actions without requiring retraining.

System Environment

Figure 1:
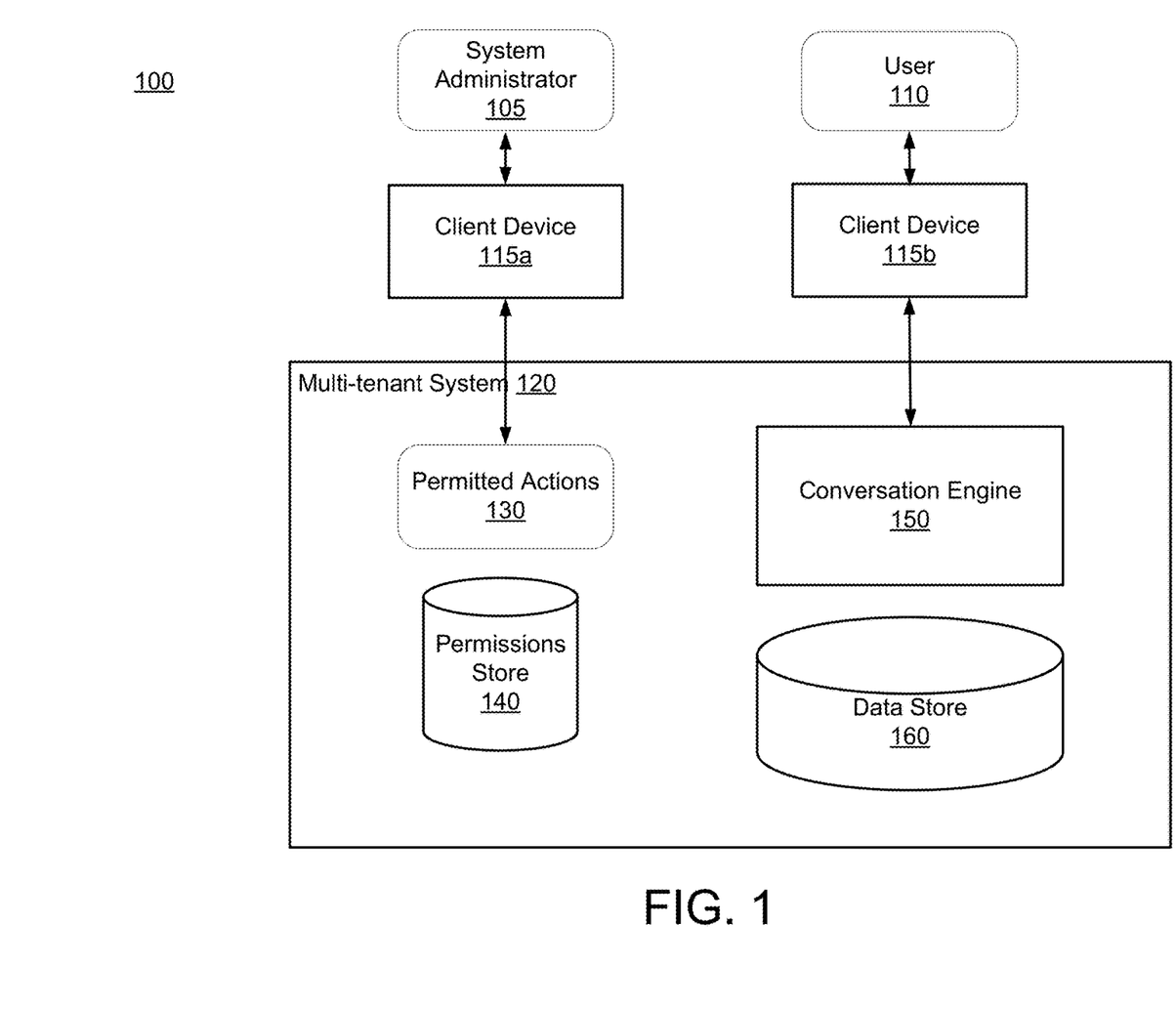
FIG. 1 is a block diagram of a system environment 100 for actions according to requests made by users through natural language conversations with the multi-tenant system, according to one embodiment.

FIG. 1 is a block diagram of a system environment 100 for performing actions according to requests made by users through natural language conversations with the multi-tenant system according to one embodiment. The system environment 100 includes a multi-tenant system 120 that communicates with users via client devices 115. Some users are privileged users, for example, system administrators who are allowed to perform specific actions that other users cannot. The multi-tenant system 120 includes a permissions store 140, a conversation engine 150, and a data store 160. The multi-tenant system 120 may include other components not shown in FIG. 1, for example, various applications, other types of data stores, and so on. The system environment 100 may include other elements not shown in FIG. 1, for example, a network.

The multi-tenant system 120 allows a system administrator 105 to specify permitted actions 130 that a user or sets of users are allowed to perform using the multi-tenant system 120. For example, the multi-tenant system 120 allows the system administrator 105 to define roles for users and specify permitted actions 130 for each role. The system administrator 105 may define roles for users, thereby specifying the permitted actions 130 that a user can perform. Metadata describing the permitted actions 130 for different roles or users is stored in permissions store 140. In an embodiment, the permissions store 140 includes one or more tables to store relations between roles and permitted actions, relations between users and roles, and optionally, relations between users and permitted actions.

Once the permitted actions 130 for a user 110 are specified, the user 110 can perform natural language conversations with the multi-tenant system 120 to perform the actions. The conversation engine 150 stores the instructions that allow the multi-tenant system 120 to perform natural language conversations with users 110. The conversation engine 150 receives a natural language request from a user and determines the permitted action 130 that the user requested via the natural language request. The conversation engine 150 uses a machine learning based model, for example, a neural network to determine a permitted action 130 corresponding to a natural language request.

Figure 2A:
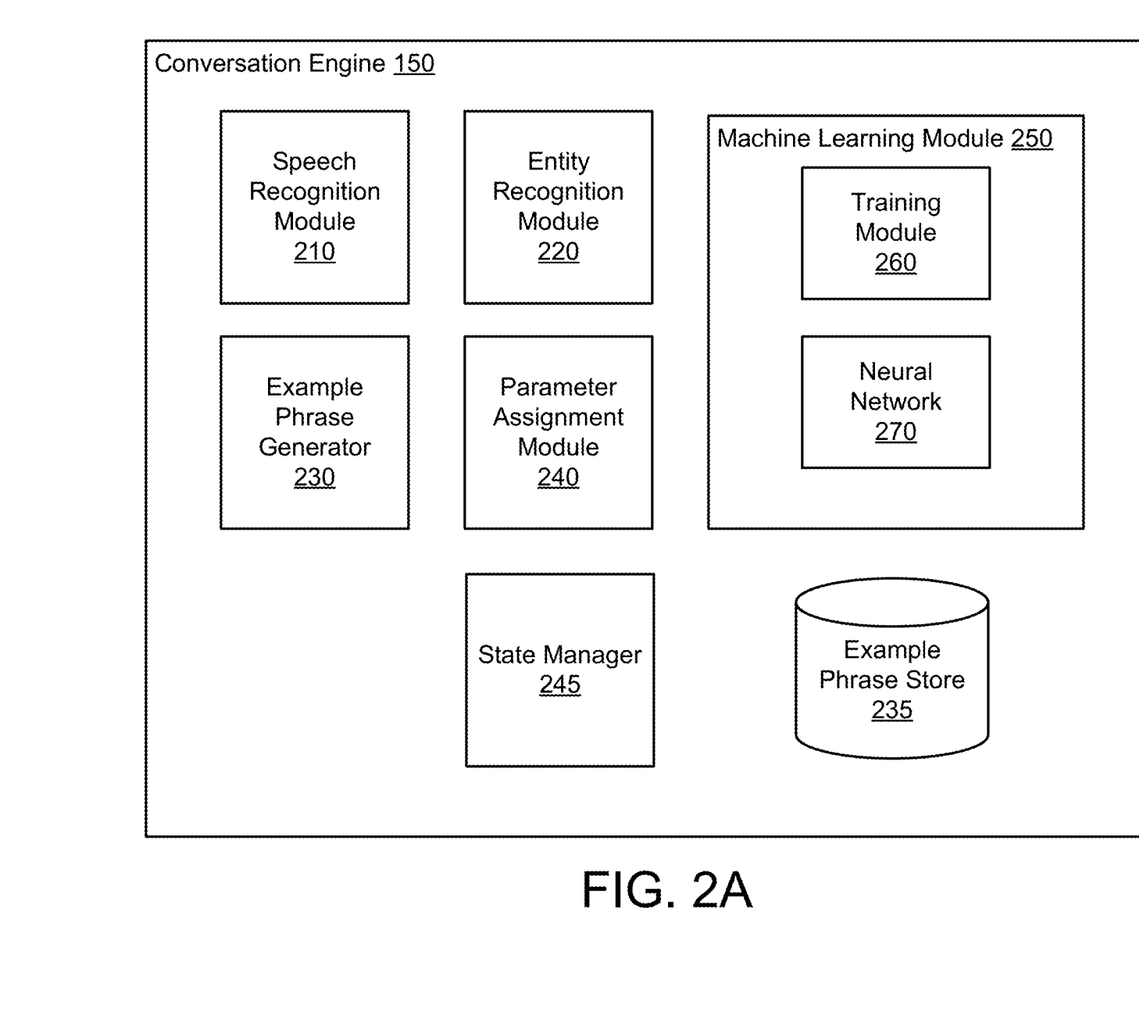
FIG. 2A is a block diagram illustrating components of the conversation engine of the multi-tenant system, according to one embodiment.

The conversation engine 150 determines whether additional information is needed to perform the permitted action and performs further conversation with the user to receive the additional information. After collecting the required information, the multi-tenant system performs the requested action. The components of a conversation engine 150 are further described in detail herein, for example, in FIG. 2.

The multi-tenant system 120 stores data in data store 160 that may be processed by a permitted action. For example, a permitted action may update data stored in data store 160, search for data stored in data store 160, and so on. The data store 160 stores data for users of the multi-tenant system. In an embodiment, the data store 160 stores information describing entities represented in the multi-tenant system. Each entity has an entity type. Each entity stores values in fields or data fields. Examples of entity types include account, case, opportunity, and so on. An entity representing an account stores information describing a user or an enterprise; an entity representing an opportunity represents a potential customer and stores fields representing information identifying the potential customer, a status of the opportunity, the last interaction with the potential customer; an entity representing a case stores information describing an interaction between an enterprise and a customer and stores fields comprising the date of the interaction, the type of the interaction, and other details of the interaction.

The data store 160 may be implemented as a relational database storing one or more tables. Each table contains one or more data categories logically arranged as columns or fields. Each row or record of a table contains an instance of data for each category defined by the fields. For example, a data store 160 may include a table that describes a customer with fields for basic contact information such as name, address, phone number, fax number, etc. Another table might describe a purchase order, including fields for information such as customer, product, sale price, date, etc.

In some embodiments, the multi-tenant system 120 stores data of multiple tenants to form a multi-tenant system. Each tenant may be an enterprise. For example, a tenant may be a company that employs sales people that use the multi-tenant system 120 to manage their sales processes. A multi-tenant system may store data for multiple tenants in the same physical database but enforce a logical separation of data across tenants. As a result, one tenant does not have access to another tenant's data, unless such data is expressly shared.

Each tenant may define its own metadata associated with entities and actions. For example, two tenants may define different sets of entity types. Furthermore, for the same entity type, two tenants may store different sets of fields. Two tenants may define different sets of actions for their entity types. For example, one tenant may allow users to update specific fields of an entity types but another tenant may not allow these updates. Accordingly, the conversation engine 150 may map a natural language request from a user to different permitted actions for two different tenants. Furthermore, two tenants may store their data using different underlying data schemas. Accordingly, the same permitted action may execute different sets of instructions for two different tenants. Embodiments use the same trained machine learning based model across different tenants. Accordingly, the machine learning based model is not retrained for each tenant.

In an embodiment, multi-tenant system 120 implements a web-based customer relationship management (CRM) system. For example, the multi-tenant system 120 may include application servers configured to implement and execute CRM software applications as well as provide related data, code, forms, webpages and other information to and from client devices 115 and to store to, and retrieve from, a database system related data, objects, and webpage content.

The multi-tenant system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the multi-tenant system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

FIG. 2 is a block diagram illustrating components of the conversation engine of the multi-tenant system, according to one embodiment. The multi-tenant system 120 comprises a speech recognition module 210, an entity recognition module 220, an example phrase generator 230, an example phrase store 235, a parameter assignment module 240, and a machine learning module 250. Other embodiments can have different and/or other components than the ones described here, and that the functionalities can be distributed among the components in a different manner.

The speech recognition module 210 receives audio signal as input and converts it into a computer readable format, for example, text for further processing. The speech recognition module 210 allows a user to use voice for conducting conversations with the multi-tenant system 120. The output of the speech recognition module 210 is provided as input to other modules of the multi-tenant system 120, for example, the machine learning module 250 or the parameter assignment module 240.

The entity recognition module 220 identifies an entity that is related to a permitted action that is requested by a user. For example, a natural language request may mention a particular name that matches various entities including an enterprise, a business, a user, an organization, and so on. The entity recognition module 220 determines the particular entity that the user is most likely to refer to in the natural language request. In other embodiments, the entity recognition module 220 ranks the matching entities based on criteria including the popularity of different entities, the role or roles of the user, the types of entities accessed by the user in the past, and so on. The entity recognition module 220 ranks the entities based on the criteria and selects an entity based on the ranking. In an embodiment, the entity recognition module 220 presents a ranked list of matching entities to the user via a user interface and requests a selection of the correct entity from the user.

The example phrase generator 230 generates several example phrases corresponding to each action that can be performed by the multi-tenant system. The conversation engine 150 compares a natural language request with example phrases to identify a matching example phrase. An example phrase represents a predefined phrase that represents a request for a particular action that can be performed using the multi-tenant system 150. The example phrase store 235 stores the example phrases.

Figure 2B:
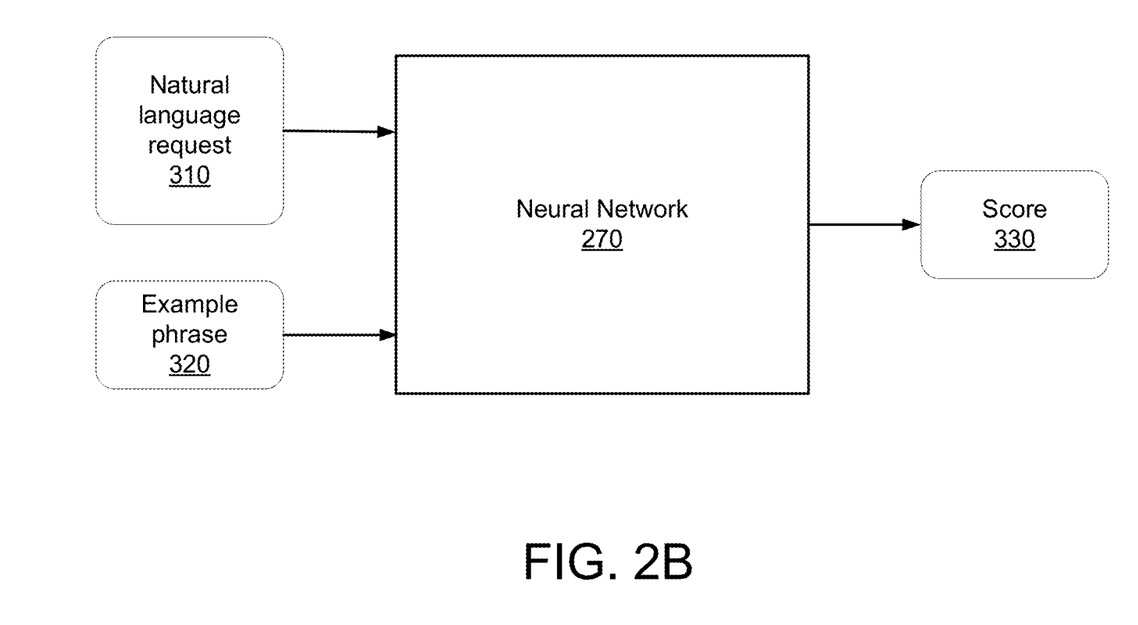
FIG. 2B illustrates a neural network for determining whether an example phrase can be inferred from a natural language request, according to an embodiment.

The machine learning module 250 uses the training module 260 to train a machine learning based model, for example, the neural network 270 to process natural language requests. FIG. 2A illustrates a neural network for determining whether an example phrase can be inferred from a natural language request, according to an embodiment. An example phrase can be inferred from a natural language request if the natural language request implies the example phrase.

The neural network 270 is configured to receive two inputs: (1) a natural language request 310 and (2) an example phrase 320. The neural network 270 generates a score 330 indicating a measure of confidence that the example phrase can be inferred from the natural language request. For example, a higher measure of confidence indicates a higher likelihood that the example phrase can be inferred from the natural language request. Given two example phrases, the scores generated by the neural network for a natural language request can be compared to determine which example phrase reflects the intent of the natural language request better. Furthermore, given a set of example phrases, the neural network 270 can be executed using pairs of the natural language request and example phrases from the set as input to generate scores. The scores can be compared to determine the beast matching example phrase that represents the intent of the natural language request. The neural network 270 may be trained using labelled training data set storing pairs of natural language requests and example phrases that can be inferred from them.

Generation of Example Phrases

The example phrase store 235 stores an association between each example phrase and the intent of the example phrase. The intent of the example phrase corresponds to an action that can be performed by the multi-tenant system. In an embodiment, the intent corresponding to each example phrase is represented using an enumerated value. Accordingly, the conversation engine represents the set of intents as an enumeration. In an embodiment, each intent maps to an action of the multi-tenant system 150.

In an embodiment, the example phrase store 235 stores a document that serializes a data structure used for associating the actions with the example phrases. Following is an example, of a document used for storing example phrases.
  query:
    description: Field Query
    example_phrases:
      What is
      Show me
      Where is

```
    get contact info
    email
create:
    description: Create a contact, lead, opportunity, or case)
    example_phrases:
        new
        create a
        create an
        log a
        log an
        create
        log
update:
    description: update standard objects and custom objects
    example_phrases:
        update
        update a
        update an
```

The above example document includes a list of actions, for example, query, create, and update. For each action the document specifies (1) the name of the action followed by (1) a "description" tag storing the description of the action and (2) an "example_phrases" tag storing a list of example phrases. For example, the query action is associated with example phrases "what is," "show me," "where is," and so on; the create action is associated with example phrases "new," "create a," "create an," and so on; and the update action is associated with example phrases "update," "update a," "update an," and so on.

In an embodiment, the conversation engine 150 stores a hierarchy of sets of example phrases, such that example phrases in sets that are lower in the hierarchy are more specific than example phrases in sets that are higher in the hierarchy. An action is more specific than another action if it specifies more details of the entity associated with the action or parameters associated with the action. For example, the action "access a contact" is more specific than an action "access any entity" since it specifies the type of entity that needs to be accessed. Similarly, the action "access a contact with name John" is more specific than the action "access a contact" since it specifies an additional parameter "name".

In an embodiment, the conversation engine 150 stores a two level hierarchy of sets including (1) a set S1 of broad actions that are applicable across entity types and (2) another set S2 of specific actions that are specific to entity types. For example, the set S1 includes broad action such as search, update, create, and so on that can be performed on any entity type. The set S2 includes specific actions such as create a contact, update a case, search for all contacts with a given last name, and so on. The set S1 is predefined, for example, by a system administrator or a developer and stored in the example phrase store 235. Furthermore, the set S1 is shared across tenants and is applicable to all tenants.

The example phrase generator 230 generates specific actions for set S2 by adding details to broad actions of set S1. The example phrase generator 230 selects a broad action from set S1 and an entity type and generates specific actions for set S2 by adding metadata of the entity type to the broad action. Metadata of the entity type added to the broad action may include information describing the fields of the entity type. For example, example phrase generator 230 takes the broad action "what is his" and the entity type contact with fields: name, address, and phone number to generate specific actions "what is his name," "what is his address," and "what is his phone number."

In an embodiment, the broad actions are represented as a template that specifies where a field name may be added in an example phrase representing the broad action. For example, the template may specify that the field name may be added at the end of the example phrase, the field name may be added in the beginning or at a particular location in the middle of the example phrase.

In an embodiment, the example phrase generator 230 generates a set S2 for each tenant since different tenants may have different entity types. Furthermore, for the same entity type, different tenants may have different fields. In an embodiment, a tenant is allowed to customize the set S1 by adding or modifying the broad actions. Accordingly, the example phrase store 235 may store a set S1 as well as a set S2 for each tenant.

In an embodiment, the example phrase store 235 stores parameters for each action. The parameters represent values that are used by the multi-tenant system 150 to perform the action. For example, to create an entity type contact, the multi-tenant system 150 may specify various fields of the contact including name, phone number, email, address, and so on. The example phrase store 235 may indicate some parameters as required and some as optional. For example, the name field may be required in a contact but the email may be optional. An example of a set of specific actions stored in the example phrase store 235 is as follows.

```
get_phone_number:
    description: get phone number
    samples:
        phone number
        what is his phone number
        what is her phone number
        I want to call someone
        get contact info
    required:
    PERSON:
        Contact name
    optional:
    return:
        Phone
get_address:
    description: get the address for an Account Name
    samples:
        address
        what is the address
        where is
        location
    required:
    ORG:
        Account Name
    optional:
    return:
        Address
get_email:
    description: get the email for a Lead Name
    samples:
        email
        email for someone
        what is someone email
    required:
    PERSON:
        Lead Name
    optional:
    return:
        Email
```

The above set of example phrases includes example phrases for three action: get_phone_number, get_address, and get_email. All these actions are associated with entity type contact. For each action, the example phrase store 235 stores the following: (1) the name of the action followed by (2) a "description" tag storing a textual description of the action, (3) an "example phrases" tag storing one or more example phrases, (4) a "required" tag storing a list of required parameters, (5) an "optional" tag storing a list of optional parameters, and (6) a "return" tag storing a value returned by the action.

Overall Process

Figure 3:
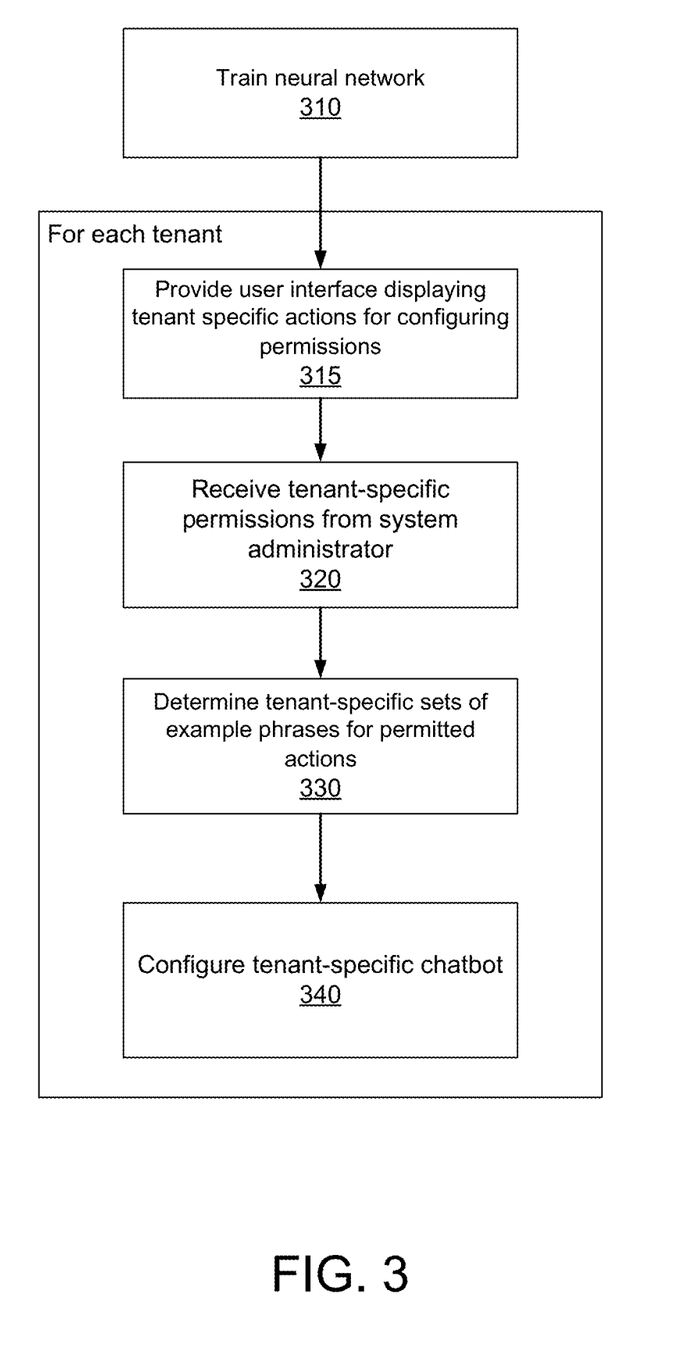
FIG. 3 is a flow chart illustrating the process for configuring tenant-specific chatbots for performing actions of the multi-tenant system according to an embodiment.

FIG. 3 is a flow chart illustrating the process for configuring tenant-specific chatbots for performing actions of the multi-tenant system according to an embodiment. Other embodiments can perform the steps of FIG. 4 in different orders. Other embodiments can include different and/or additional steps than the ones described herein.

The training module 260 trains 310 the neural network 270 to receive a natural language request and an example phrase as input and output a score indicating whether the example phrase can be inferred from the natural language request. In an embodiment, the training module 260 trains the neural network 270 using labeled data set comprising several pairs of natural language requests and corresponding example phrases.

The multi-tenant system 120 repeats the steps 320, 330, and 340 for each tenant. As disclosed herein, the tenant represents the set of users of an organization that is a customer of the multi-tenant system, or a subset of users of the organization including one or more users.

The multi-tenant system 120 provides 315 a user interface displaying actions that can be performed using the multi-tenant system for configuring permissions of users describing the permitted actions for users. The multi-tenant system 120 receives 320 tenant-specific permissions information from system administrator and stores the received information in the permissions store 140. The tenant-specific permissions information may specify sets of permitted actions for a user or a set of users.

In an embodiment, the multi-tenant system 120 stores roles for different users. A system administrator specifies actions that are permitted to a given role. For example, certain role may be allowed to update contact information, another role may be allowed to create opportunity objects, and so on. Each user may be associated with one or more roles. Accordingly, the multi-tenant system 120 determines the set of permitted actions for a user to be the union of sets of actions that can be performed by the roles assigned to the user.

The example phrase generator 230 determines 330 a set of example phrases for each of the permitted actions for a tenant. Each example phrase represents a natural language request for performing a corresponding permitted action. The multi-tenant system 120 configures 340 a tenant-specific chatbot using the above information including the neural network and the sets of example phrases corresponding to permitted actions for a tenant. The multi-tenant system 120 provides the neural network and the tenant-specific sets of example phrases to the conversation engine 150. The conversation engine 150 performs conversations with user to perform actions of the multi-tenant system 120.

Figure 4:
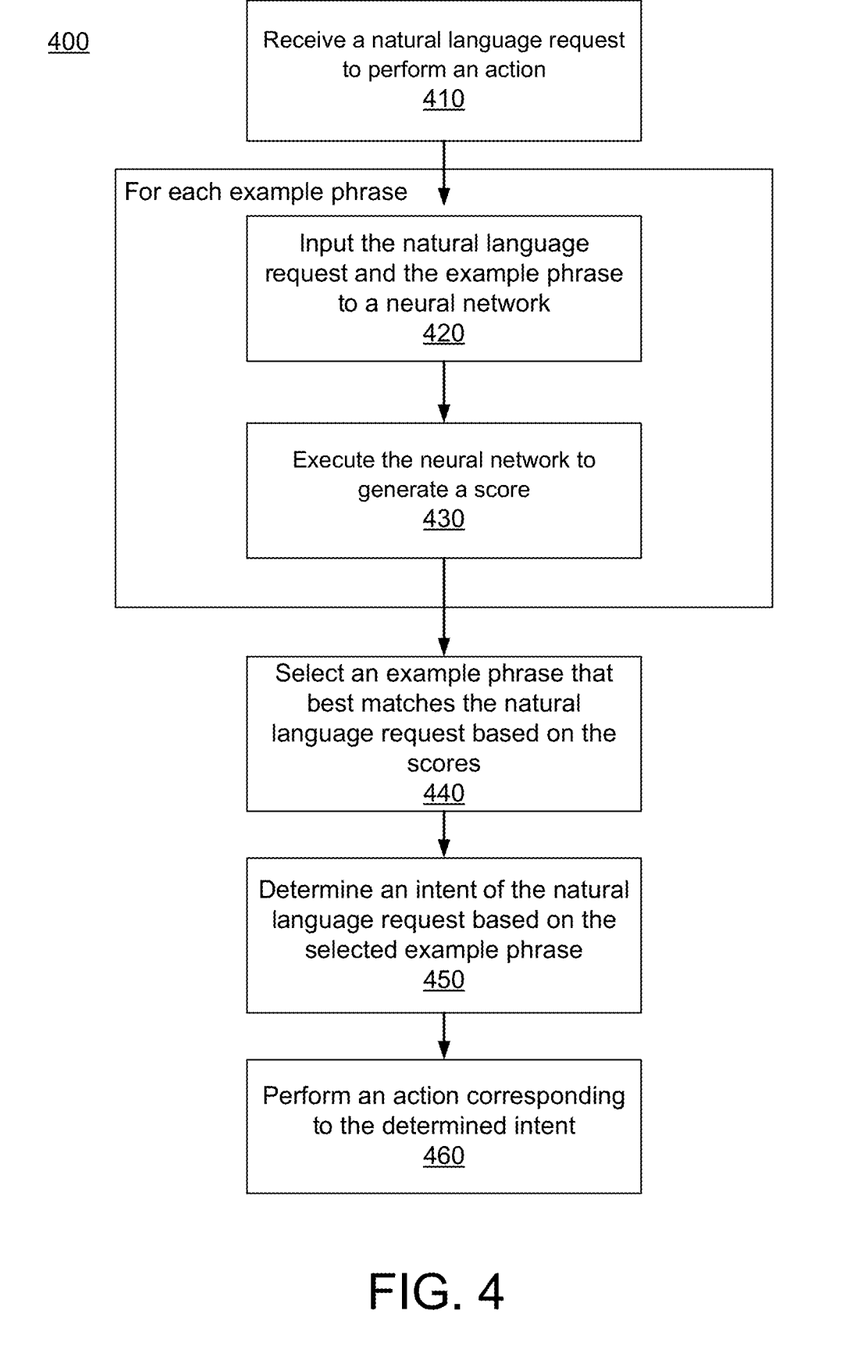
FIG. 4 is a flow chart illustrating the process for determining an action of the multi-tenant system represented by a natural language request and performing the action according to an embodiment.

FIG. 4 is a flow chart illustrating the process for determining an action of the multi-tenant system represented by a natural language request and performing the action according to an embodiment. Other embodiments can perform the steps of FIG. 4 in different orders. Other embodiments can include different and/or additional steps than the ones described herein.

The conversation engine 150 receives 410 a natural language request to perform an action. The natural language request may be received as a text string via a user interface or as an audio signal spoken by a user and is received from a microphone of a client device. The conversation engine 150 transcribes any audio signal to generate text corresponding to the audio signal.

The conversation engine 150 determines an intent corresponding to the natural language request using the neural network 270. The conversation engine 150 matches the natural language request against sets of example phrases corresponding to permitted actions of the user to identify the best matching example phrase. The conversation engine 150 provides 420 each example phrase and the natural language request as input to the neural network 270. The conversation engine 150 executes 430 the neural network 270 using these inputs to generate a score. In an embodiment, the score indicates a measure of confidence that the example phrase can be inferred from the natural language request.

The conversation engine 150 compares the generated scores for the example phrases to select 440 an example phrase that best matches the natural language request. The conversation engine 150 determines 450 the intent of the natural language request based on the selected example phrase. The intent represents the action of the multi-tenant system that the user wants to perform. The multi-tenant system 120 performs an action corresponding to the determined intent. In an embodiment, the multi-tenant system performs further conversation with the user to determine further details of the requested action as illustrated in FIG. 5.

Figure 5:
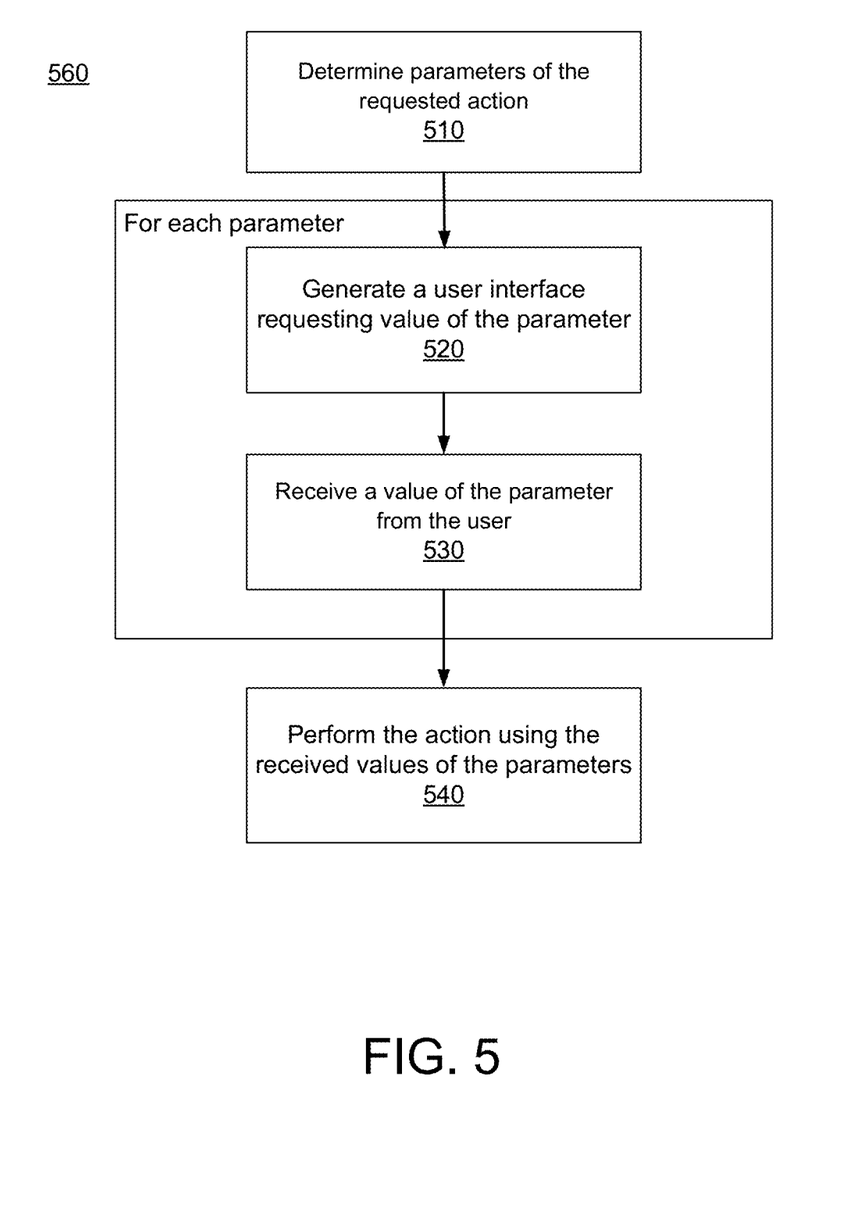
FIG. 5 is a flow chart illustrating the steps for performing a requested action by the multi-tenant system according to an embodiment.

FIG. 5 is a flow chart illustrating the steps for performing a requested action by the multi-tenant system according to an embodiment. Other embodiments can perform the steps of FIG. 5 in different orders. Other embodiments can include different and/or additional steps than the ones described herein.

The conversation engine 150 determines 510 parameters required for performing the determined action. For example, if the action represents creating a new contact, the parameters may represent the various fields of the contact that need to be specified to create the contact. The conversation engine 150 performs an online conversation with the user to receive values of the parameters. Accordingly, the conversation engine 150 repeats the following steps for each parameter. The conversation engine 150 generates 520 a user interface requesting a value for the parameter from the user. The conversation engine 150 sends the generated user interface to the user via a client device and receives 530 a value of the parameter from the user. In an embodiment, the conversation engine 150 maintains states for tracking the values that have been obtained or remain to be obtained and performs state transitions to determine the next dialog to be presented to the user. If the conversation engine 150 determines that all the values of the parameters needed for performing the action are obtained, the multi-tenant system 120 performs 540 the action using the obtained values.

Figure 6A:
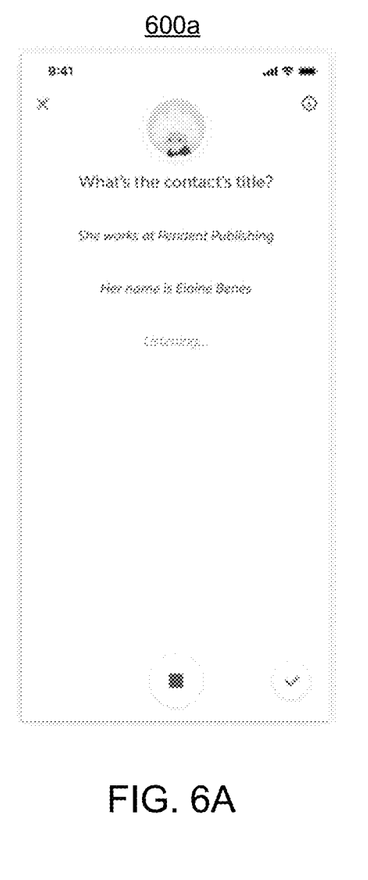
FIG. 6A shows a user interface generated by the conversation engine 150 for requesting a parameter value for the action according to an embodiment.
Figure 6B:
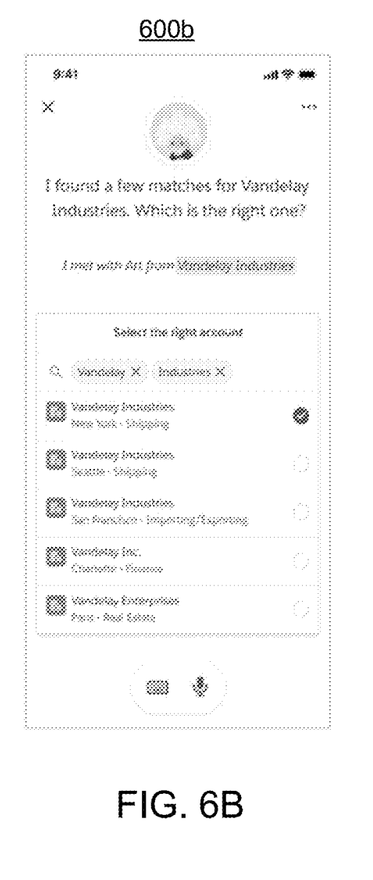
FIG. 6B shows a screenshot of a user interface displaying entities that may be associated with an action requesting the user to select the right entity for performing the action according to an embodiment.
Figure 6C:
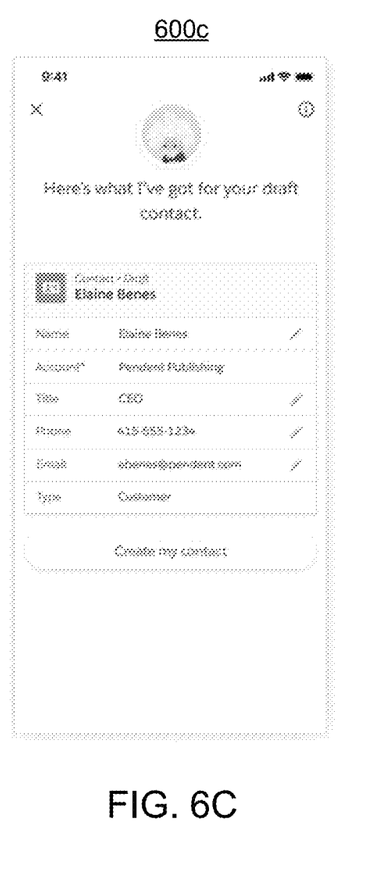
FIG. 6C shows a screenshot of a user interface displaying all the parameter values collected by the conversation engine for the action according to an embodiment.

FIGS. 6A-C show screenshots of user interfaces illustrating a conversation performed by the conversation engine according to an embodiment. FIG. 6A shows a user interface generated by the conversation engine 150 for requesting a parameter value for the action according to an embodiment. Specifically, the user interface 600*a* requests a field "title" of an entity type contact. In some embodiments the interface between the user and the conversation engine is voice based or a combination of text and voice. For example, the conversation engine 150 may display the text but also generate a voice signal corresponding to the displayed text and similarly, the conversation engine 150 receives voice signal from the user, transcribes the voice signal to text and displays text signal to the user.

FIG. 6B shows a screenshot of a user interface displaying entities that may be associated with an action requesting the user to select the right entity for performing the action according to an embodiment. The conversation engine 150 may determine that the action corresponding to the intent of the natural language request may be performed using multiple entities. For example, the conversation engine may determine that natural language request is for updating the contact for a particular business identified using a business name. However, several records representing contacts may match the name of the business specified in the natural language request. Accordingly, the conversation engine 150 presents information describing the matching entities via a user interface 600*b* with a widget that allows the user to select a particular entity.

FIG. 6C shows a screenshot of a user interface displaying all the parameter values collected by the conversation engine for the action according to an embodiment. As shown in FIG. 6C, the conversation engine 150 displays various attributes collected for creating a new contact. The conversation engine 150 may proceed to perform the action, for example, by creating a new contact. Alternatively, the conversation engine 150 receives a confirmation from the user indicating that the parameter values collected for the action are correct before performing the action.

Computer Architecture

Figure 7:
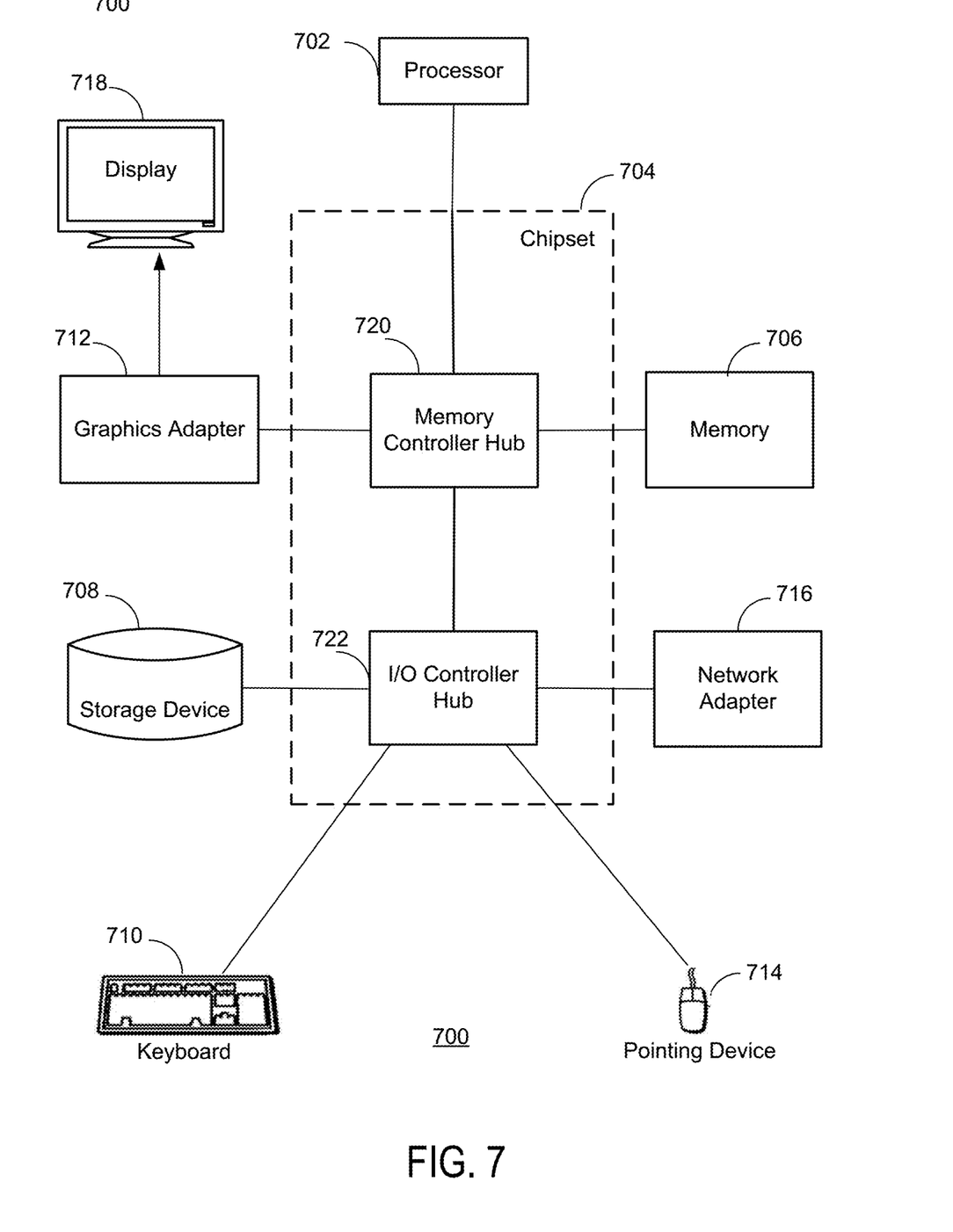
FIG. 7 is a block diagram illustrating a functional view of a typical computer system according to one embodiment.

FIG. 7 is a high-level block diagram illustrating a functional view of a typical computer system for use as one of the entities illustrated in the environment 100 of FIG. 1 according to an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as a multi-tenant system 120 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 115 may be a mobile phone with limited processing power, a small display 718, and may lack a pointing device 714. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for enabling custom configuration of a tenant-specific chatbot to process and act upon natural language requests without requiring tenant-specific training, the method comprising:
   providing a user interface displaying a set of actions;
   receiving a selection of one or more actions from the set of actions;
   configuring the selected one or more actions as a tenant-specific set of permitted actions;
   generating a set of tenant-specific example phrases for each of the tenant-specific permitted actions based on metadata associated with the tenant-specific permitted actions, each example phrase representing a natural language request for performing a corresponding permitted action; and
   configuring a tenant-specific chatbot to:
   (i) receive a natural language request to perform one of the tenant-specific permitted actions,
   (ii) for an example phrase from the sets of example phrases, input the natural language request and the example phrase into a neural network to receive a score indicating whether said example phrase can be inferred from the natural language request, wherein the neural network is configured to receive (a) an input natural language request and (b) an input example phrase and output a score indicating whether the input example phrase can be inferred from the input natural language request, and
   (iii) if a score obtained from an example phrase meets a threshold indicating that the example phrase can be inferred from the natural language request, perform the tenant-specific permitted action corresponding to the example phrase.

2. The method of claim 1, further comprising:
   performing an online conversation comprising:
      determining one or more parameters required for performing the determined action; and
      receiving values of the one or more parameters, comprising, for a parameter:
         generating a request to receive a value for the parameter;
         sending the generated request to a user via a user interface dialog; and
         receiving the value of the parameter from the user.

3. The method of claim 1, wherein determining each set of example phrases comprises:
   accessing a first set of example phrases, each example phrase representing a request for an action that is independent of an entity type; and
   generating a second set of example phrases, wherein each example phrase from the second set of example phrases is obtained by adding text representing entity type specific information to an example phrase from the first set of example phrases.

4. The method of claim 3, wherein the action corresponding to the example phrase from the first set of example phrases is associated with an entity type, wherein the added text to the example phrase from the first set of example phrases represents information describing at attribute of the entity type.

5. The method of claim 3, further comprising:
   mapping the natural language request to one of the example phrases comprising:
      mapping the natural language request to an example phrase from the first set of example phrases;
      determining a subset of example phrases from the second set of example phrases that were obtained from the mapped example phrase of the first set of example phrases; and
      mapping the natural language request to the subset of example phrases.

6. The method of claim 1, wherein determining the sets of example phrases for the permitted actions is performed after receiving the natural language request.

7. The method of claim 1, wherein the set of example phrases is a first set of example phrases, further comprising:
   storing a plurality of different sets of example phrases, wherein the set of example phrases is one of the plurality of different sets; and
   using the trained neural network against each of the plurality of sets of example phrases without retraining the neural network for each distinct set of example phrases.

8. The method of claim 1, wherein a particular natural language request maps to two different actions for two different tenants.

9. The method of claim 7, wherein each tenant has a distinct set of entity types and actions, wherein each tenant stores a set of example phrases different from sets of example phrases of other tenants.

10. The method of claim 1, wherein the tenant-specific chatbot is configured for a subset of users from an organization associated with a multi-tenant system.

11. A non-transitory computer readable storage medium storing instructions that when executed by one or more computer processors, cause the one or more computer processors to perform steps for enabling custom configuration of a tenant-specific chatbot to process and act upon natural language requests without requiring tenant-specific training, the steps comprising:

providing a user interface displaying a set of actions;
receiving a selection of one or more actions from the set of actions;
configuring the selected one or more actions as a tenant-specific set of permitted actions;
automatically generating a set of tenant-specific example phrases for each of the tenant-specific permitted actions based on metadata associated with the tenant-specific permitted actions, each example phrase representing a natural language request for performing a corresponding permitted action; and
configuring a tenant-specific chatbot to:
  (i) receive a natural language request to perform one of the tenant-specific permitted actions,
  (ii) for an example phrase from the set of example phrases, input the natural language request and the example phrase into a neural network to receive a score indicating whether said example phrase can be inferred from the natural language request, wherein the neural network is configured to receive (a) an input natural language request and (b) an input example phrase and output a score indicating whether the input example phrase can be inferred from the input natural language request, and
  (iii) if a score obtained from an example phrase meets a threshold indicating that the example phrase can be inferred from the natural language request, perform the tenant-specific permitted action corresponding to the example phrase.

12. The non-transitory computer readable storage medium of claim 11, wherein the instructions further cause the one or more computer processors to perform steps comprising:
performing an online conversation comprising:
  determining one or more parameters required for performing the determined action; and
  receiving values of the parameters, comprising, for each parameter:
    generating a request to receive a value for the parameter;
    sending the generated request to a user via a user interface dialog; and
    receiving the value of the parameter from the user.

13. The non-transitory computer readable storage medium of claim 11, wherein determining the set of example phrases comprises:
accessing a first set of example phrases, each example phrase representing a request for an action that is independent of an entity type; and
generating a second set of example phrases, wherein each example phrase from the second set of example phrases is obtained by adding text representing entity type specific information to an example phrase from the first set of example phrases.

14. The non-transitory computer readable storage medium of claim 13, wherein the action corresponding to the example phrase from the first set of example phrases is associated with an entity type, wherein the added text to the example phrase from the first set of example phrases represents information describing at attribute of the entity type.

15. The non-transitory computer readable storage medium of claim 13, wherein the instructions further cause the one or more computer processors to perform steps comprising:
mapping the natural language request to one of the example phrases comprising:
  mapping the natural language request to an example phrase from the first set of example phrases;
  determining a subset of example phrases from the second set of example phrases that were obtained from the mapped example phrase of the first set of example phrases; and
  mapping the natural language request to the subset of example phrases.

16. The non-transitory computer readable storage medium of claim 11, wherein determining the set of example phrases for the permitted actions is performed after receiving the natural language request.

17. The non-transitory computer readable storage medium of claim 11, wherein the set of example phrases is a first set of example phrases, wherein the instructions further cause the one or more computer processors to perform steps comprising:
storing a plurality of different sets of example phrases, wherein the set of example phrases is one of the plurality of different sets; and
using the trained neural network against each of the plurality of sets of example phrases without retraining the neural network for each distinct set of example phrases.

18. The non-transitory computer readable storage medium of claim 11, wherein a particular natural language request maps to two different actions for two different tenants.

19. The non-transitory computer readable storage medium of claim 17, wherein each tenant has a distinct set of entity types and actions, wherein each tenant stores a set of example phrases different from sets of example phrases of other tenants.

20. A computer system comprising:
one or more computer processors; and
a non-transitory computer readable storage medium storing instructions that when executed by the one or more computer processors cause the one or more computer processors to perform steps for enabling custom configuration of a tenant-specific chatbot to process and act upon natural language requests without requiring tenant-specific training, the steps comprising:
  providing a user interface displaying a set of actions;
  receiving a selection of one or more actions from the set of actions;
  configuring the selected one or more actions as a tenant-specific set of permitted actions;
  generating a set of tenant-specific example phrases for each of the tenant-specific permitted actions based on metadata associated with the tenant-specific permitted actions, each example phrase representing a natural language request for performing a corresponding permitted action; and
  configuring a tenant-specific chatbot to:
    (i) receive a natural language request to perform one of the tenant-specific permitted actions,
    (ii) for an example phrase from the set of example phrases, input the natural language request and the example phrase into a neural network to receive a score indicating whether said example phrase can be inferred from the natural language request, wherein the neural network is configured to receive (a) an input natural language request and (b) an input example phrase and output a score indicating whether the input example phrase can be inferred from the input natural language request, and (iii) if a score obtained from an example phrase meets a threshold indicating that the example phrase can be inferred from the natural language request, perform the tenant-specific permitted action corresponding to the example phrase.

* * * * *